(12) United States Patent
Poitzsch et al.

(10) Patent No.: US 7,852,708 B2
(45) Date of Patent: Dec. 14, 2010

(54) SENSING AND ACTUATING IN MARINE DEPLOYED CABLE AND STREAMER APPLICATIONS

(75) Inventors: Martin E. Poitzsch, Derry, NH (US);
Pabitra N. Sen, Chapel Hill, NC (US);
Karen Wiemer, Cambridge (GB);
Guillemette Picard, Paris (FR);
Muthusamy Vembusubramanian, Acton, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 12/121,325

(22) Filed: May 15, 2008

(65) Prior Publication Data

US 2009/0285051 A1 Nov. 19, 2009

(51) Int. Cl.
*G01V 1/38* (2006.01)
(52) U.S. Cl. ........................................................ 367/19
(58) Field of Classification Search .................... 367/16, 367/19
See application file for complete search history.

(56) References Cited

U.S. PATENT DOCUMENTS

| | | | | |
|---|---|---|---|---|
| 4,404,664 A * | 9/1983 | Zachariadis | .................. | 367/19 |
| 4,660,185 A * | 4/1987 | French | ......................... | 367/19 |
| 6,302,204 B1 | 10/2001 | Reimers et al. | | |
| 6,704,244 B1 | 3/2004 | Vaage | | |
| 6,978,832 B2 | 12/2005 | Gardner et al. | | |
| 7,082,993 B2 | 8/2006 | Ayoub et al. | | |
| 7,092,315 B2 | 8/2006 | Olivier | | |
| 7,440,357 B2 * | 10/2008 | Hopperstad | .................. | 367/41 |
| 2003/0094281 A1 | 5/2003 | Tubel | | |
| 2003/0122535 A1 | 7/2003 | Williams et al. | | |
| 2003/0205083 A1 | 11/2003 | Tubel et al. | | |
| 2004/0045705 A1 | 3/2004 | Gardner et al. | | |
| 2005/0012036 A1 | 1/2005 | Tubel et al. | | |
| 2006/0272809 A1 | 12/2006 | Tubel et al. | | |
| 2007/0179713 A1 * | 8/2007 | Scott | ........................... | 702/14 |

OTHER PUBLICATIONS

Bar-Cohen, Y. Electric Flex: Electrically activated plastic muscles will let robots smile, arm-wrestle, and maybe even fly like bugs. IEEE Spectrum, Jun. 25, 2005, pp. 1-6.
White, S.R., et al., Autonomic healing of polymer composites, Nature, vol. 409, Feb. 15, 2001, pp. 794-796 with correction vol. 415, Feb. 14, 2002, p. 817.
Degennes, P.G., et al., Mechanoelectric in ionic gels, Europhysics Letters, vol. 50, Issue 4, May 15, 2000, pp. 513-518.
D'Angelo, M.V., et al., Single Fiber Transport in a Fracture Slit: Influence of the Wall Roughness and of the Fiber Flexibility, Transport in Porous Media, DOI 10.1007/s11242-009-9507-x, Dec. 5, 2009, pp. 1-20.

* cited by examiner

*Primary Examiner*—Jack Keith
*Assistant Examiner*—Krystine Breier
(74) *Attorney, Agent, or Firm*—James McAleenan; Vincent Loccisano; Brigid Laffey

(57) ABSTRACT

Methods and related systems are described for use with hydraulic fracturing and other oilfield applications. A tool body is positioned in a wellbore at a location near a subterranean rock formation being fractured. The tool body contains a plurality of deployable continuous fibers. At least some of the deployable continuous fibers are deployed into fractures within a subterranean rock formation. Each deployed fiber is continuous from the tool body to the rock formation. The number of deployable continuous fibers provides sufficient redundancy to make at least a target measurement relating to the fracturing process.

31 Claims, 11 Drawing Sheets

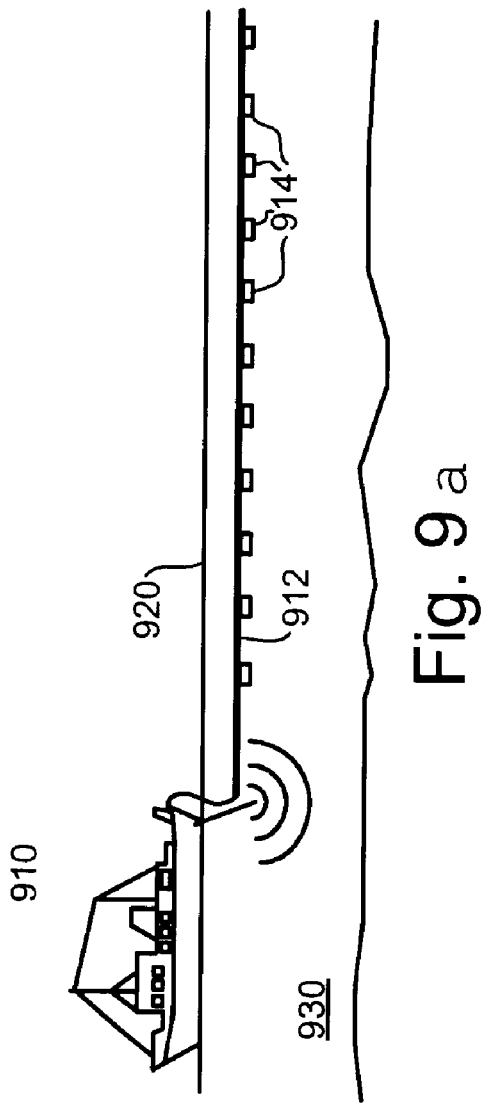
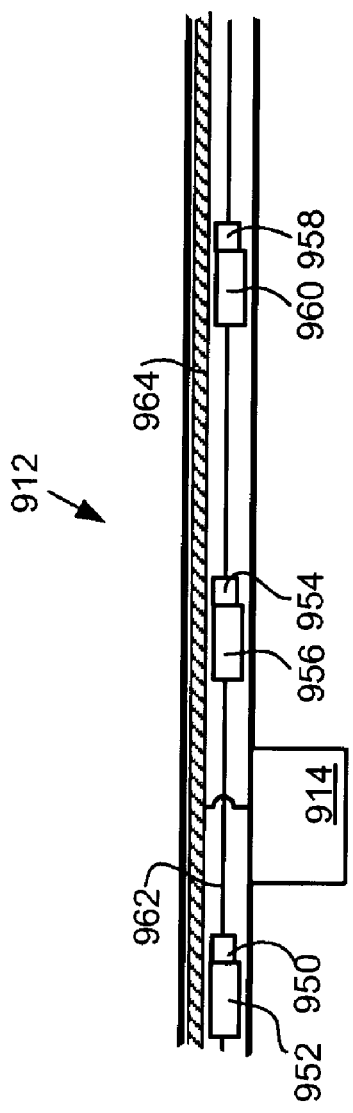

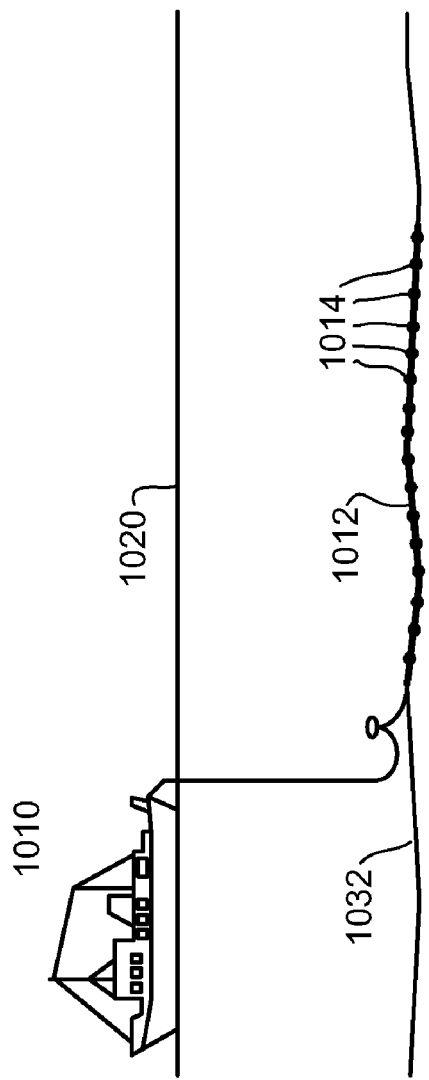
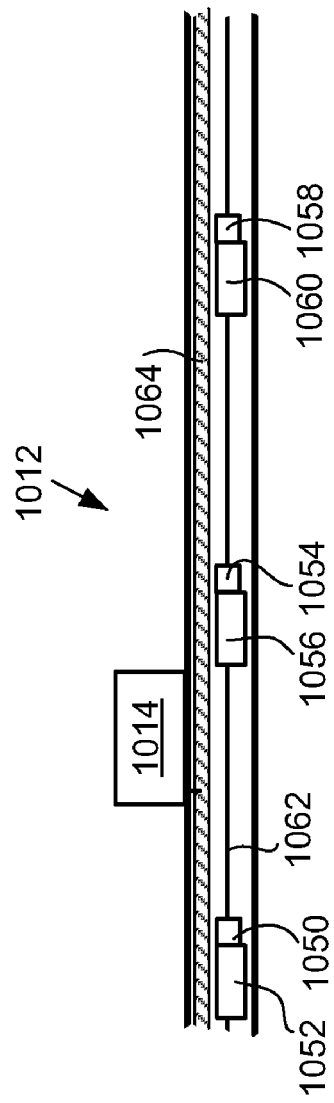

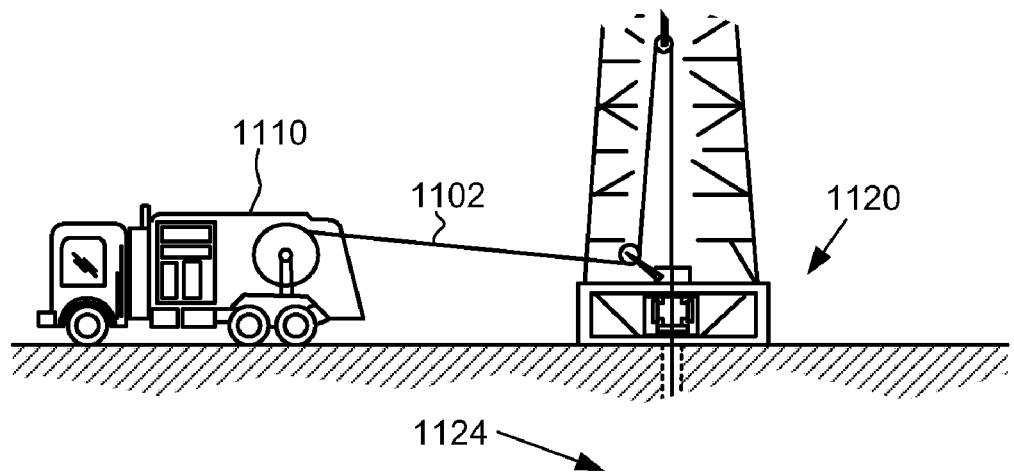
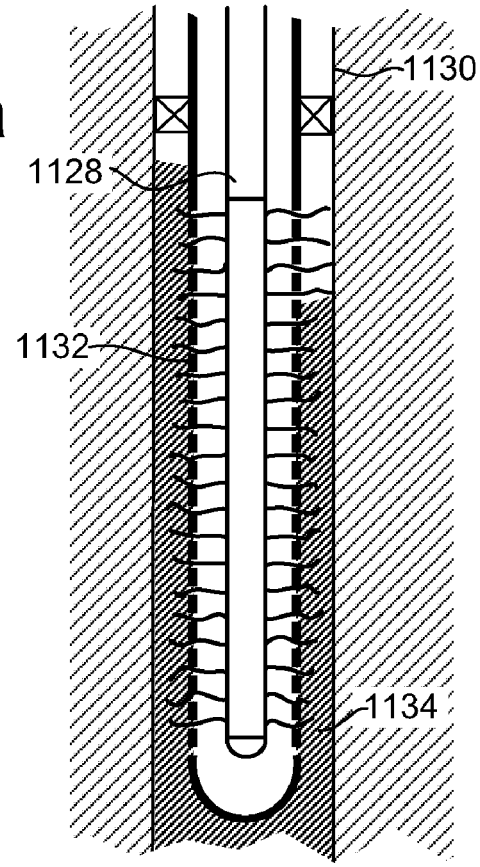
Fig. 11a
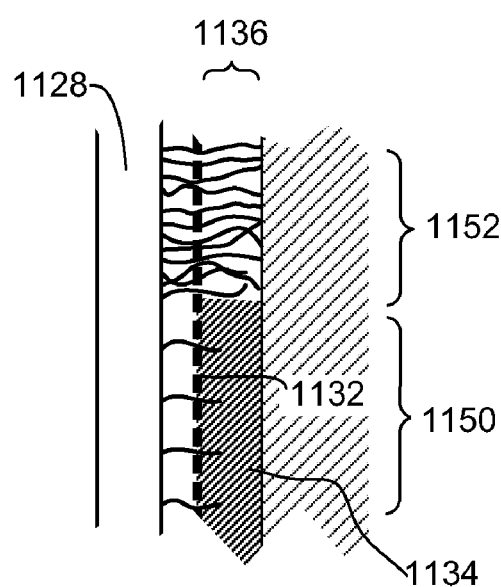
Fig. 11b

SENSING AND ACTUATING IN MARINE DEPLOYED CABLE AND STREAMER APPLICATIONS

CROSS REFERENCE TO RELATED APPLICATIONS

This patent application is related to the following commonly owned United States patent applications:

4) U.S. patent application Ser. No. 12/121,302, filed on the same date as the present application entitled "CONTINUOUS FIBERS FOR USE IN HYDRAULIC FRACTURING APPLICATIONS", which is incorporated by reference in its entirety for all purposes.

5) U.S. patent application Ser. No. 12/121,311, filed on the same date as the present application entitled "SENSING AND MONITORING OF ELONGATED STRUCTURES", which is incorporated by reference in its entirety for all purposes.

6) U.S. patent application Ser. No. 12/121,330, filed on the same date as the present application entitled "CONTINUOUS FIBERS FOR USE IN WELL COMPLETION, INTERVENTION, AND OTHER SUBTERRANEAN APPLICATIONS", which is incorporated by reference in its entirety for all purposes.

BACKGROUND OF THE INVENTION

1. Field of the Invention

This patent specification relates to hydraulic fracture monitoring and other oilfield applications. More particularly, this patent specification relates to systems and methods for fiber-based evaluation, monitoring and/or control of hydraulic fracturing of subterranean rock formations surrounding boreholes, as well as to other applications where a fiber-based device or tool can be pumped into an otherwise inaccessible space.

2. Background of the Invention

Many hydrocarbon reservoirs worldwide have passed peak production. As about 70% of the hydrocarbon present in a reservoir is not recovered by the initial recovery strategies, many challenges and opportunities exist for so-called brownfields concerning the tail production of the field. In formations with low permeability, producing hydrocarbon is difficult. Thus, stimulating techniques are used to increase the net permeability of a reservoir. One of the techniques consists of using fluid pressure to fracture the formation or extend existing cracks and existing channels from the wellbore to the reservoir thus creating alternative flow paths for the oil or, more commonly, gas to be produced at a higher rate into the wellbore. The geometry of the new flow path determines the efficiency of the process in increasing the productivity of the well.

There is a need for characterization of the new flow path geometry. To date, direct measurement is not possible, and the geometry is generally inferred from fracturing models, or interpretation of pressure measurements. Alternatively, micro-seismic events generated in the vicinity of the new fractures are recorded downhole. Interpretation indicates direction, length and height of the fractures. Still, this "hydraulic fracturing monitoring" or HFM technique is an indirect measurement for which interpretation is hard to verify. In addition, it requires the mobilization of costly wireline borehole seismic assets that are not a very good fit for the economics of the hydraulic fracturing market on land; and a nearby offset well is normally required for monitoring.

Proposals have been made to introduce a fiber optic cable and use light to probe the fracture. For example, see: U.S. Pat. No. 6,978,832, and U.S. Patent Application Publication No. 2005/0012036. However, such techniques can be prone to reliability issues due to poor deployment within fractures. A technique described in U.S. Pat. No. 7,082,993 uses a plurality of active or passive discrete devices such as electronic microsensors, radio-frequency transmitters or acoustic transceivers to transmit their position as they flow with the fracture fluid/slurry inside the created fracture. Active discrete devices can form a network using wireless links to neighboring microsensors. An optical fiber can be deployed through the perforations when the well is cased and perforated or directly into the fracture in an open hole situation, thereby allowing length measurements as well as pressure and temperature measurements. However, such techniques may in general be limited due to signal strength and power constraints on the discrete devices; and their cost is also an open question.

SUMMARY OF THE INVENTION

According to embodiments, a marine seismic survey system is provided. The system includes an elongated element, such as seismic streamer or ocean bottom cable, deployed from a seismic vessel designed and arranged to collect seismic information from a plurality of receivers spaced apart along the length of the elongated element. The system includes a plurality of sensing elements located on the elongated element in a spaced apart fashion along substantially the entire length of the elongated element.

According to further embodiments, a method for conducting a marine seismic survey is provided. A seismic streamer is deployed in sea water from a seismic vessel, the streamer having a plurality of hydrophones for collecting seismic information. Sensing is performed using a plurality of secondary sensing elements located on the streamer in a spaced apart fashion along substantially the entire length of the streamer.

According to further embodiments, a method for conducting a marine seismic survey is provided wherein an ocean bottom cable is deployed on the sea floor. The cable has a plurality of multi component sensor for collecting seismic information. Sensing is performed using a plurality of secondary sensing elements located on the cable in a spaced apart fashion along substantially the entire length of the cable.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 9a and 9b show seismic streamers having sensors and/or actuators with high linear density deployed in a marine environment, according to embodiments;

FIGS. 10a and 10b show ocean bottom cable having sensors and/or actuators with high linear density deployed in a marine environment, according to embodiments; and FIGS. 11a and 11b show a plurality of continuous fibers deployed in a gravel pack completion, according to embodiments.

DETAILED DESCRIPTION OF THE PREFERRED EMBODIMENTS

Figure 1:
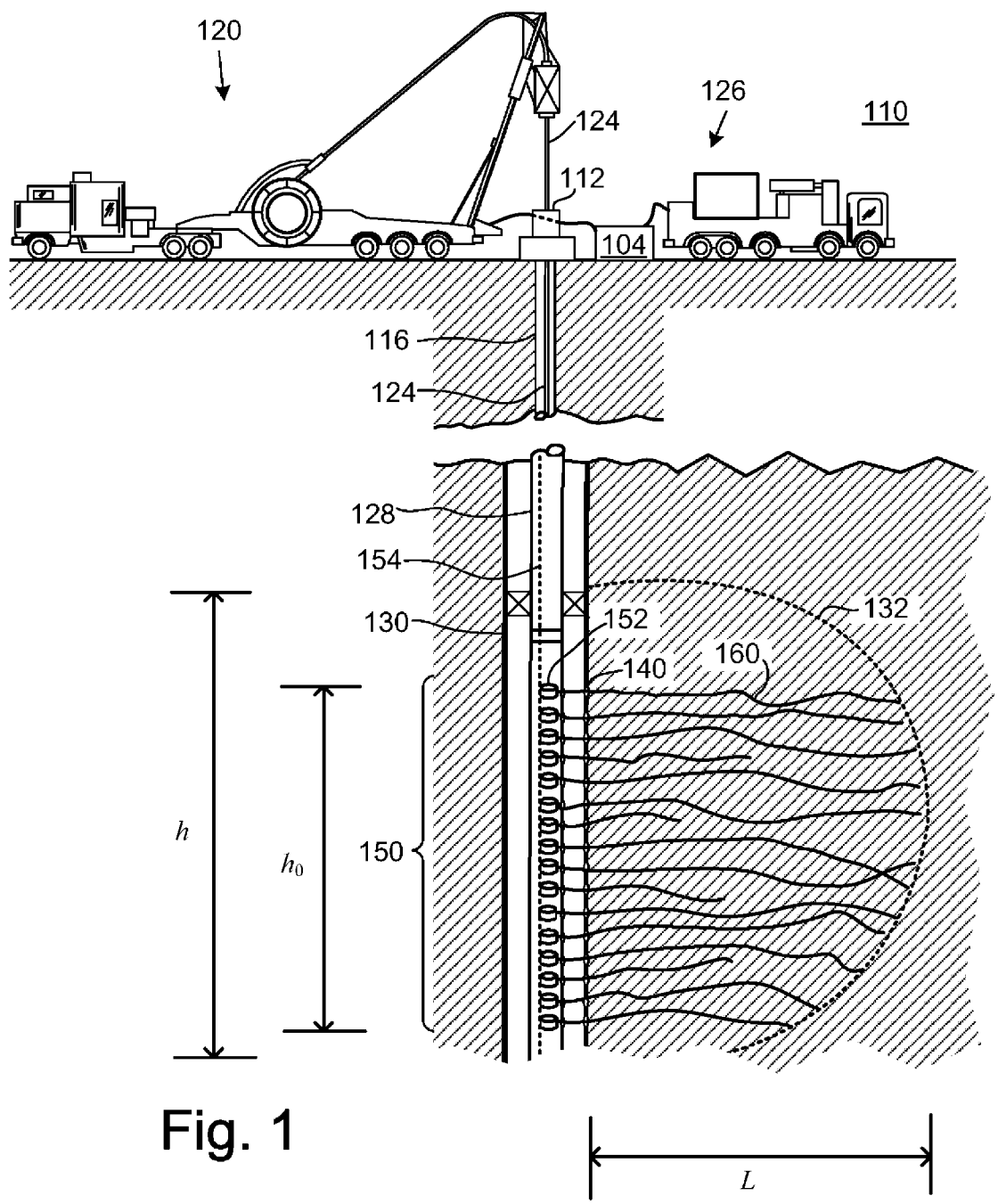
FIG. 1 shows the deployment of continuous fibers during a fracturing operation, according to embodiments.

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

The neural structure of the most simple, primitive animals, such as nematode worms, echinoderms, and jellyfish, serves as a paradigm for the design of simple circuitry along fibers that enables low-level, local processing, potentially all or mostly in analog mode, of physical measurements in order to combine and assimilate measurements for summary transmission back to the borehole. Autonomous local actuation of events, such as chemical release, in response to sensory inputs, and other application-specific low-level functionalities can also be provided.

According to embodiments, the novel fiber and fiber-gel measurement and instrumentation techniques disclosed herein are well suited to downhole applications for a number of reasons and also to other monitoring applications in long, linear structures such as cables and/or streamers. In fracturing applications, the techniques described herein take advantage of the flow and viscous drag of pumped frac gels to conduct long, continuous fibers into a hydraulic fracture during the pumping of the frac. More particularly, the described techniques take advantage of the shear-thinning rheology of some commonly-used frac gels, which should reduce any tendency for fibers to stick to the rough walls of the fracture and tend to channel the fibers in the middle of the fracture. Alternatively, this technique can be used with other fluids such as water or water having polymer or other additives such as "slick water." According to various embodiments, the continuous fibers can be: nonconductive fibers, conductive carbon fibers, optical fibers, or electrical conductors (e.g., metal), either single or multiple conductor bundles, twisted pairs, tiny coaxial cables, or combinations thereof.

Following is a discussion which describes techniques for (a) transporting continuous fibers driven by the flow of frac fluids from the wellbore through the perforation and within the fractures; (b) localizing the position of the fibers along the transport; and (c) using bunches of fibers as probes or as transmitters interrogating local probes.

Also following is a description of techniques for using novel polymeric gels and/or plastic materials to fill hydraulic fractures in oil or gas wells to evaluate, control and monitor the fractures, in conjunction with other downhole measurement methods. Having loaded the fracture with suitable polymeric material (e.g., having conducting and/or piezoelectric elements embedded), to initially evaluate the geometry of the fracture by electrical and acoustic means, among other techniques. These gels can contain, among other sensory elements, conductive fibers with "neuronal" networks/circuits. These biologically-inspired networks operate to imitate nervous reflexes and non-cognitive (i.e., locally-processed) perception—this can be likened to sensory organs of jellyfish tentacles or Venus flytraps. Stress-sensitive capsules filled with acid and other fracturing fluids or chemicals can be used to induce stimulation at later times. The options of closing fractures, controlling oil and water flows, and eventually sealing up the fractures also exist.

Methods of delivery of "smart," biologically-inspired materials in downhole formations are described herein for controlling, monitoring and actuating hydraulic formation fractures and other features. The smart, biologically-inspired materials have special sensory features for downhole uses, for example within fractures. The use of measurements and tools employing deep sensors situated in a borehole and using acoustic, electric, electromagnetic principles and special sensory features of smart gels may have advantages over the "smart-dust" or micro-sensor network approach, which can be more limited by power considerations to smaller depths of investigation. By using continuous fibers, dramatic improvements in a number of areas can be gained included in: power delivery; properties of smart materials aiding investigation/ actuation; depth of investigation; volume of investigation, and cost of deployment of simple low cost circuitry.

FIG. 1 shows the deployment of continuous fibers during a fracturing operation, according to embodiments. On the surface 110, are a coiled tubing truck 120 and a pumping truck 126. The pumping truck pumps fluid into a manifold 104, which is in fluid communication with coiled tubing truck 120, or alternatively, directly into the coiled tubing 124. The tubing 124 enters wellbore 116 via well head 112. At or near the lower end of tubing 124 is frac bottom hole assembly (BHA) 128. Casing 130 is shown in FIG. 1 with perforations such as perforation 140, although according to other embodiments, the techniques described operate in open-hole (uncased) application in an analogous manner. According to embodiments, the fracturing fluid is used for controlling the transport of continuous fibers, such as fiber 160, from the borehole to the fracture. However, in between fracturing stages with high pressure flow, there are steps where fracturing fluids are circulated to clean the borehole and fractures. Thus, according embodiments, either a fracturing stage or a cleaning stage during or just after the fracturing process is used for deployment of the continuous fibers. It has been found that the fracturing fluid will transport the fibers into the fractures. The specific flow profile of non-Newtonian fluids favors the transport within the fractures by channeling the fibers away from the rugose walls.

The fibers are wound on spools located within BHA 128 such as spool 152, in borehole 116. The BHA 128 forms a type of fiber management module which is used both to deploy the fiber via the spools and to collect data from the fibers and transmit data to the surface via communication line 154. The communication line 154 could be fiber optic or electric. Alternatively, other forms of telemetry could be used instead of a physical line, such as fluid pressure pulse telemetry, long-range electro magnetic wireless telemetry, or inductive transmission through the tubing and/or casing. The fracture front or "tip" is shown with the broken line 132. The fracturing operation shown in FIG. 1 is injecting a polymeric frac gel, or some other type of frac fluid such as slick water, loaded with continuous fibers whose length, conductivity (and other properties) can be measured by sensors deployed and placed in the borehole. Although only 16 continuous fibers are shown in FIG. 1, in practice there could be many more fibers such as 50 or 100 fibers are provided. In general the number of continuous fibers will depend on the number of perforations in the zone or zones to be fractured, the number of wings, and the estimated average success probability that a fiber will reach the tip of the fracture wing. A minimum number of recommended fibers can be expressed as follows:

$$\text{minimum number of fibers} = \frac{\text{number of fracture wings}}{\text{average probability of fiber reaching tip}}.$$

For example, for a fracture having two wings and an average expected probability of 50% for each fiber reaching the fracture tip, a minimum of four fibers should be used. However, in practice a larger number of fibers should generally be used to enhance the reliability of measurements.

The number of fibers can also be based on the number of perforations. For example, approximately one fiber can be used per perforation, such that a fracture zone having 40 perforations uses 40 fibers. Alternatively a sub multiple can be used, such as 100 perforations using 50 fibers. By providing such multiple redundancy, the techniques do not require every fiber to be successfully deployed. With greater numbers of fibers deployed, the system becomes more tolerant to errors in deployment of individual fibers. Such errors can be caused by, for example: fibers becoming physically snagged, being caught in a recirculating region of flow, failure to enter the perforation, becoming tangled with itself or with an adjacent fiber, getting cut or otherwise broken, due to spooling mechanism malfunctions, getting stuck to the wall of the fracture, differential sticking at a high permeability spot or streak in the fracture, becoming entangled with proppant or other frac materials. The lengths of the fibers can be read out from the spooling hardware as will be described further below. The array of fiber lengths spooled into the fracture wings can then be estimated. The combination of some or all of the three measured parameters of the fiber (length, velocity and tension) can be inverted to map fluid velocities and derive the fracture geometry in real time. The local force exerted on an element of fiber by the drag is proportional to the difference between the fluid local velocity and the fiber velocity. By integrating the history of the fiber length, velocity and tension, the fluid local velocity can be inverted with along the path the fiber followed. Such detailed fluid velocity information can allow for improved fluid management efficiencies, economies of materials, improved proppant transport design, and job time optimization at the wellsite.

As mentioned, in order to quality-control the measurement, a relatively large number of fibers are deployed. For example about 50 to 100 inexpensive wires or fibers 150 are used to measure an array of lengths $\{L_i\}$. In this way, there is more certainty of a statistically significant number of fibers succeeding in following the fracture tip. Since the shape of the fracture wing can often be described by a relatively simple function (although it need not be symmetric vs. depth or from one fracture wing to the other), measured lengths that are outliers can be identified as erroneous and discarded or discounted. If the two wings of the fracture are different in extent, the measured fiber lengths should cluster into two identifiable groups. Additionally, the axial extent or height $h_0$ of this array of fiber spools allows the fracture height h to be measured. In practice a function will be fitted to the quality controlled data to solve for h and the fracture length L simultaneously, possibly along with other fracture shape parameters.

Although fibers are shown deployed using a coiled tubing apparatus, in general other methods can be used for deployment. For example, the monitoring BHA could be deployed on other types of fracturing hardware, such as conventional jointed tubing, drill pipe, or at the end of an armored cable. According to further embodiments, a fiber management module from which the fibers are deployed is installed and left in place during the fracture job. Following the frac job, the fiber management module is retrieved and/or interrogated for data collection. This installation type could be performed on a slickline or wireline cable, and included and anchored as part of a packer or plug. A fiber management module could also be built into the casing and cemented in place during construction of the well.

Figure 2:
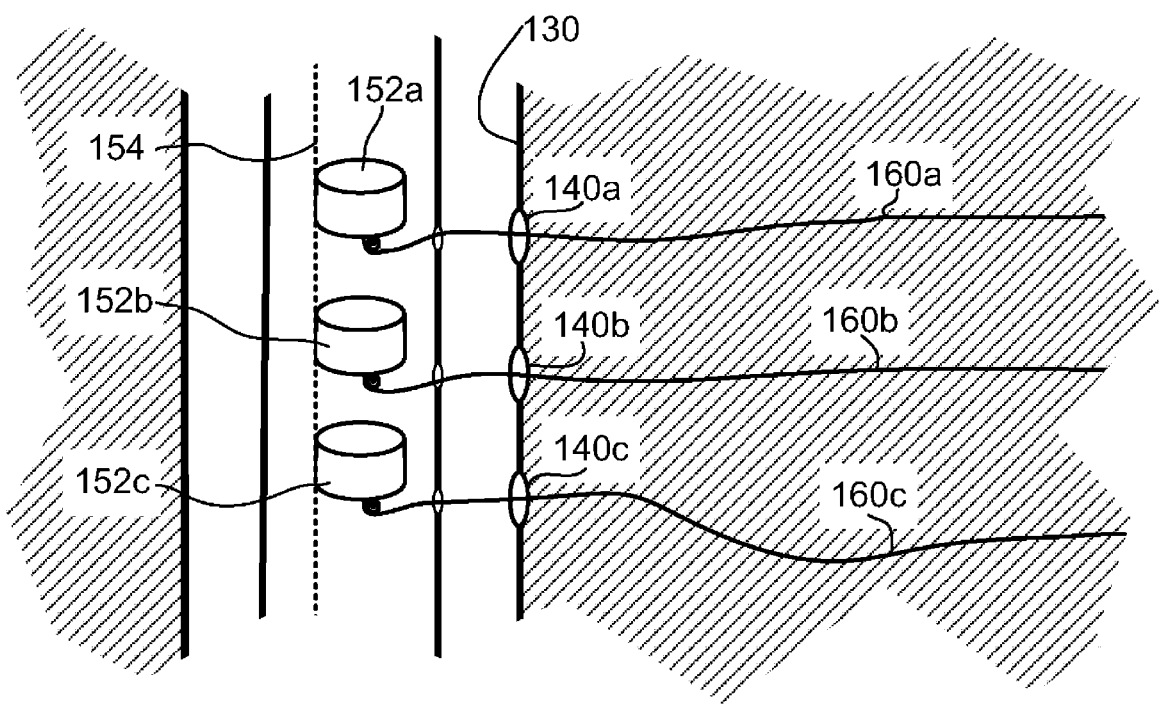
FIG. 2 shows greater detail for downhole spools of continuous fiber, according to embodiments.

FIG. 2 shows greater detail for downhole spools of continuous fiber, according to embodiments. A minimal tension should be maintained on fibers 160a, 160b and 160c so as to avoid the trapping of the fibers in locally recirculating fluid vortices or the creation of multiple loops at the perforations 140a, 140b and 140c of casing 130. The tension can be provided: (i) by maintaining a low maximum speed for the unwinding spools 152a, 152b and 152c, or (ii) by using extra or natural friction on the spools 152a, 152b and 152c themselves, such as using friction of the exit port of the spool body. According to alternate embodiments, an automatic clutch mechanism based on tension on the fiber is provided (not shown) to achieve automatic dispensing of the fiber while maintaining a pre-set tension.

Figure 3:
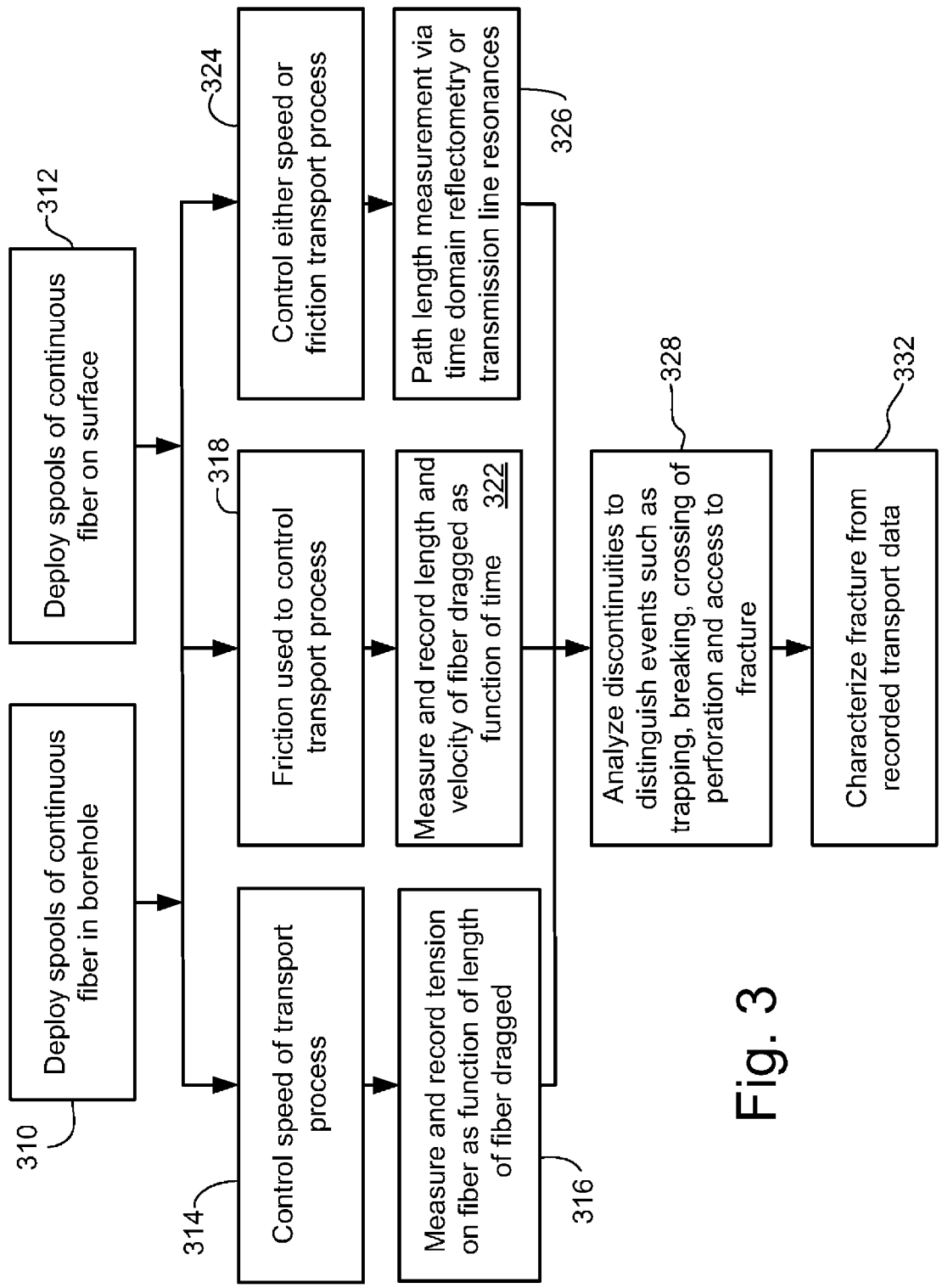
FIG. 3 is a flowchart showing steps involved in deploying continuous fibers, and measuring and interpreting data relating to the deployment, according to embodiments.

FIG. 3 is a flowchart showing steps involved in deploying continuous fibers, and measuring and interpreting data relating to the deployment, according to embodiments. In step 310, the spools of continuous fiber are deployed in a borehole as described herein. In step 312, alternatively, the spools can be deployed on the surface and continuous fibers transported from the surface to the downhole fracture region, as shown and described with respect to FIG. 4 below. The fibers are preferably localized in a manner that depends on the process used for the control of the transport. In one example, in step 314, the speed is controlled for the transport process. In step 316, a tension measurement device is added to each spool that measures the tension of the fiber. The tension of the fiber is recorded as a function of the length of fiber dragged. In another example, in step 318, a constant friction is used to control the transport process. In step 322 the length and/or velocity of fiber dragged as a function of time is measured and recorded. The length and/or velocity could be measured for example, by recording rotations or fractional rotations of the spool per unit time, or by using a pickup measurement wheel. Length and/or velocity can also be measured by detecting changes in the mass or electrical inductance of the windings remaining on the spool, for example by sensing resonance changes. According to yet another example, in step 324 friction or speed is used to control the transport process. In step 326, electrical path length measurements of the fibers can be made by time-domain reflectometry (ETDR) or from electrical "transmission line" resonance measurements using small twisted pairs or coaxes or using pairs of adjacent wires as transmission lines. In the case where optical fiber is used, optical time-domain reflectometry (OTDR) is employed to estimate the path length. Finally, a combination of techniques described in steps 316, 322 and 326 could be used to further increase accuracy and/or reliability of the measurement.

In step 328, discontinuities in these measured quantities account for changes in the fluid flow. By analyzing the discontinuities interpretations can be made to distinguish different events such as trapping, breaking, crossing of the perforation, and access to the fracture. According to another embodiment, the length of fiber spooled off in the fracture is directly measured by measuring rotations from the spool or using a small recording wheel as is known in wireline depth recorder technology.

According to embodiments, in step 332, data from the transport process of the multiple fibers are used to characterize the fractures. Depending on the transport control process (e.g. steps 314 or 318), either the velocity or the tension of each fiber is recorded. Each fiber is then localized according to steps 316, 322 and/or 326. Then, for the fibers that reached the fracture, it is shown that their velocity is a function of the surrounding fluid velocity. In step 332, the mean velocity in the fracture is inverted. Thus, a statistical analysis of the data can be inverted for the fracture characteristics, either the fracture geometry, or directly the fracture permeability.

Figure 4:
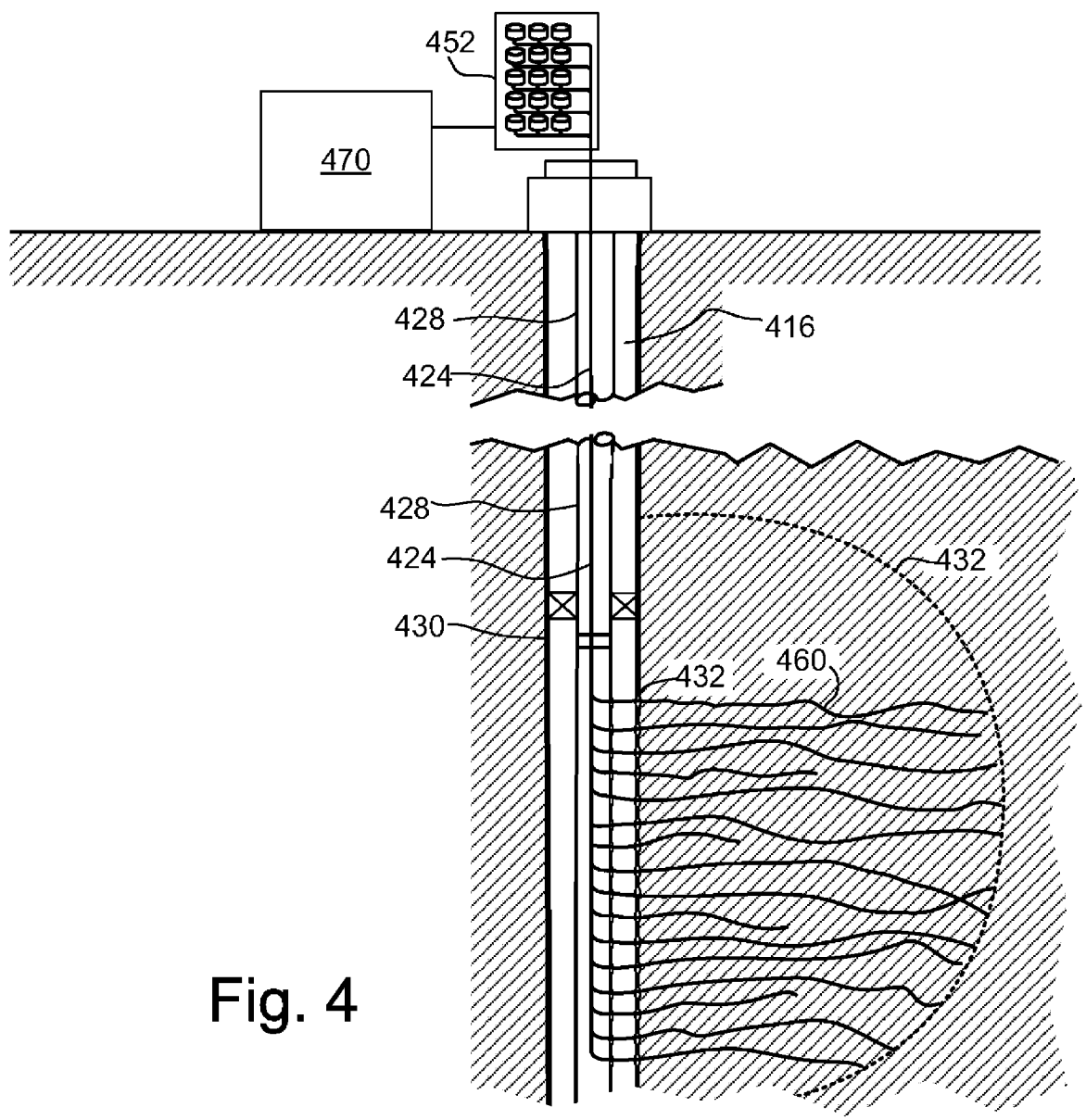
FIG. 4 shows the deployment of continuous fibers during a hydraulic fracturing operation using spools located on the surface, according to embodiments.

FIG. 4 shows the deployment of continuous fibers during a hydraulic fracturing operation using spools located on the surface, according to embodiments. Spool housing 452 is another example of a fiber management module and contains a large number of spools of continuous fiber. Arranging large numbers of spools in a relatively compact space can be in a manner analogous to spools of thread in commercial mechanized looms which have dozens or even hundreds of individual spools of thread arranged in a relatively compact space. The fibers can be deployed using a number of different technologies such as described with respect to FIG. 1. For example coiled tubing could be used for deployment. In that case, the spool housing 452 feeds the fibers into the coiled tubing at the upstream end of the tubing at the coiled tubing truck (not shown). The continuous fibers 424 pass down through the tubing 428 within wellbore 416. The fibers are deployed via viscous drag. At the fracture zone, the fibers 424 pass individually through openings in tubing 428 which are designed to match the perforations on casing 430, and on into the fractures in the formation. An individual continuous fiber 460 is shown passing through perforation 432. Since the frac fluid flow is distributed among the different perforations in the fracture zone, the frac fluid will drag the fibers 424 such that they will also tend to be distributed among the perforations. The fracture front is shown with the broken line 432. Data from the continuous fibers located in the formation pass back up through fibers 424 to the surface. Control, data storage and processing unit 470 records the data for real time processing and/or subsequent analysis and evaluation.

Figure 5:
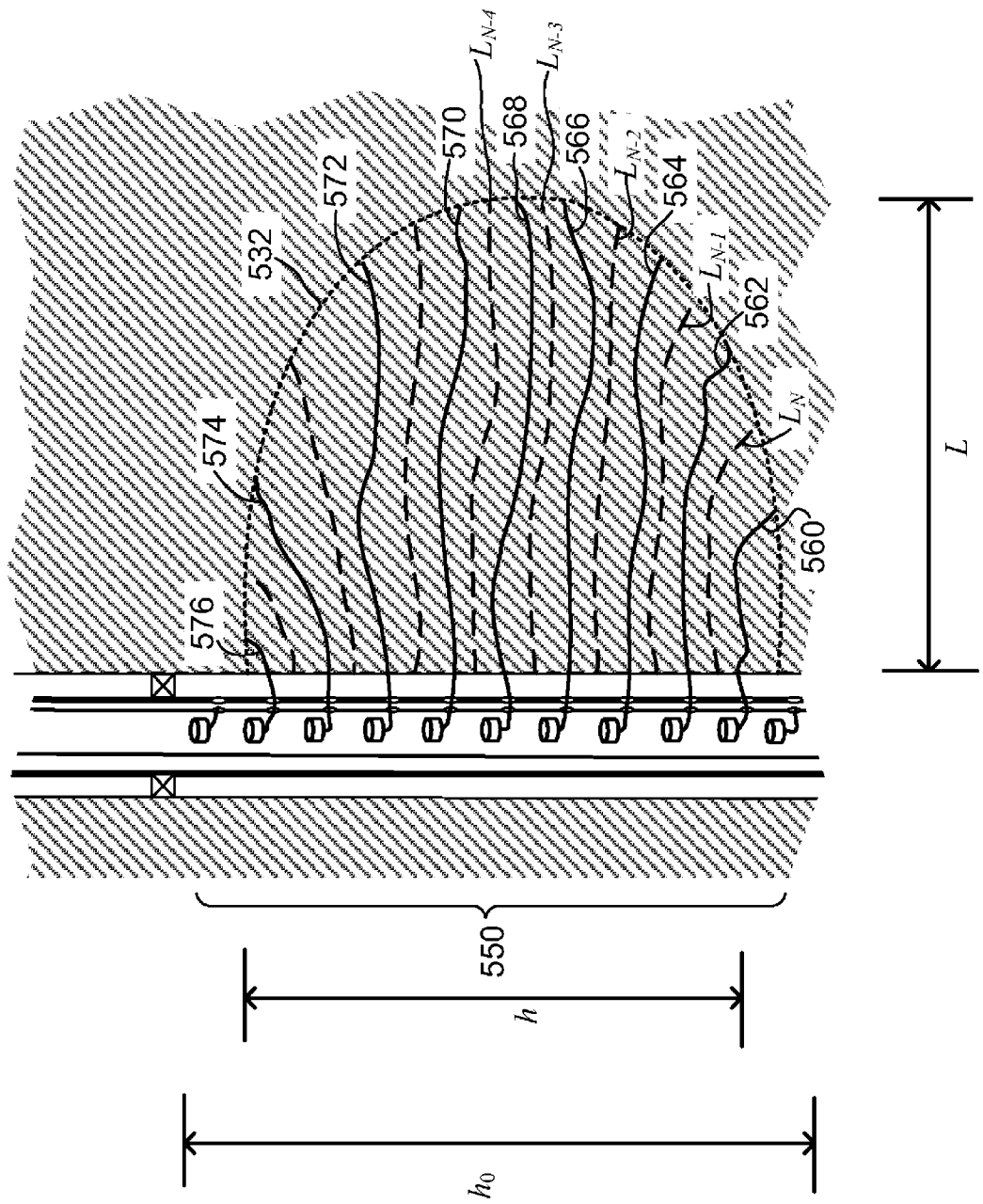
FIG. 5 shows continuous fibers deployed in a fractured formation, according to embodiments.

FIG. 5 shows an array 550 of continuous fibers deployed in a fractured formation, according to embodiments. In this example, pairs of adjacent fibers are excited as open-ended electric transmission lines in order to read out the effective lengths spooled out into the fracture. The continuous fibers 560, 562, 564, 566, 568, 570, 572, 574 and 576 are electric conductors. Pairs of adjacent fibers, such as fibers 564 and 566, can be excited as open-ended electric transmission lines in order to read out the effective lengths $L_i$ spooled out into the fracture. Each pair can be scanned for open-circuit resonances by rf reflectometry. These resonances will allow the lengths to be inferred from these electric measurements. In particular:

$$f_1^{(i)} = \frac{c}{2L_i}$$

$$f_2^{(i)} = \frac{c}{L_i}$$

$$f_3^{(i)} = \frac{3c}{2L_i}$$

$$f_1^{(i)} \approx 10 \text{ MHz} \times (10m/L_i) \quad (\text{for } \varepsilon_r \approx 2)$$

Where $f_j^{(i)}$ is the $j^{th}$ open circuit resonant frequency; c is the speed of electromagnetic propagation; $L_i$ is the $i^{th}$ effective transmission line length; and $\varepsilon_r$ is the relative dielectric constant. Knowing $f_1^{(i)}=c/2L_i$, we can infer an array of lengths $\{L_i\}$ to reconstruct the fracture front. As already stated, the number of fibers should be a larger number such as 50 or 100, for increased reliability of measurement.

Figure 6:
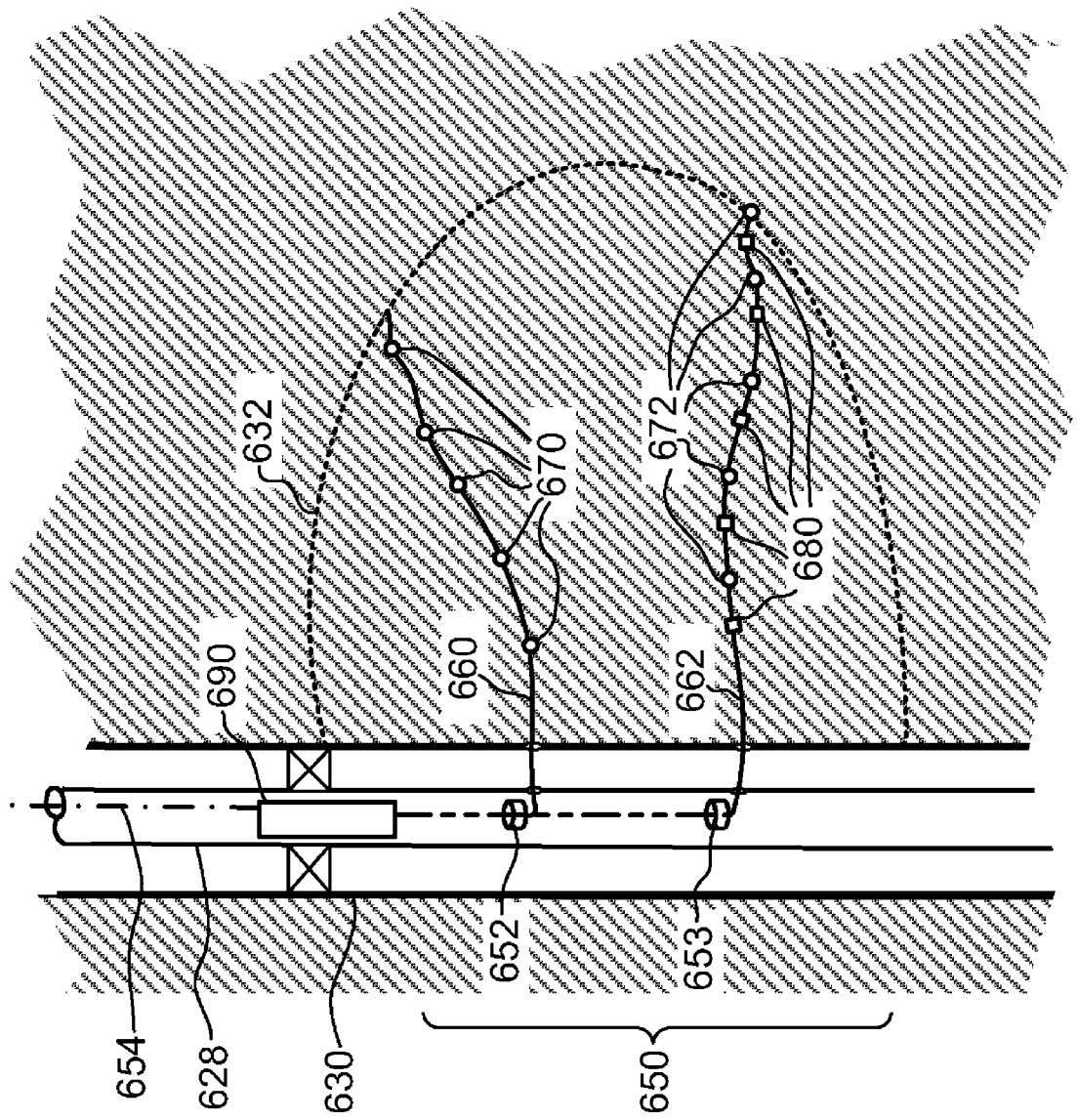
FIG. 6 shows fibers deployed in a fracture zone having sensors, processors and/or other devices included along their lengths, according to certain embodiments.

FIG. 6 shows fibers deployed into a fracture zone having sensors, processors and/or other devices included along their lengths, according to certain embodiments. BHA 628 is placed in wellbore 630. Continuous fibers 660 and 662 are shown deployed in the fracture zone bounded by frac front 632. Fibers 660 and 662 are drawn from spools 652 and 653 respectively. Although only two fibers and spools are shown in array 650 for simplicity, there would normally be many more fibers deployed in a fracture zone, such as described with respect to FIG. 1.

Fiber 660 includes disposed throughout its length a number of sensors 670. Fiber 662 includes disposed along its length a number of sensors 672. There are advantages to having the fibers only include a small number of conductors, while at the same time there are advantages in having a multitude of small sensors along the length of each fiber (for example between 5-25 sensors). According to one example, the number of sensors on each fiber matches the approximate number of deployed fibers. According to embodiments, the measured information is assimilated and locally processed or interpreted along the fiber, thereby requiring a much smaller quantity of data to be transmitted back to the borehole module via communication line 154. In the case of fiber 662, a number of processors or processing nodes 680 are included along the path to process data measured by sensor 672. These principles could be analogous to the functioning of neural synapses and reflex responses as found in certain primitive animals, such as marine invertebrates like jellyfish, sea anemones, etc., or in primitive flatworms or roundworms (nematodes). Certain of these invertebrates are able to perform rather complex and fit-for-purpose functions even in the complete absence of any "brain" or even major neural ganglion and often with a very small number of neurons involved. For example, an entire nematode worm has fewer than 200 neurons.

Data from the sensors 670 and 672 are passed back by means of fibers 660 and 662 either electrically or optically, to a measurement module 690 in the BHA. From module 690, the data are relayed by communication line 654 (which can be either electrical or fiber-optic) to the surface. According to alternate embodiments, other forms of telemetry could be used instead of a physical line such as fluid pressure pulse telemetry, long-range electro magnetic wireless telemetry, or inductive transmission through the tubing and/or casing. Sensors 670 and 672 can measure pressure, temperature, electrical conductivity, chemical species, and other important physical/chemical properties at various points inside the fracture.

Figure 7:
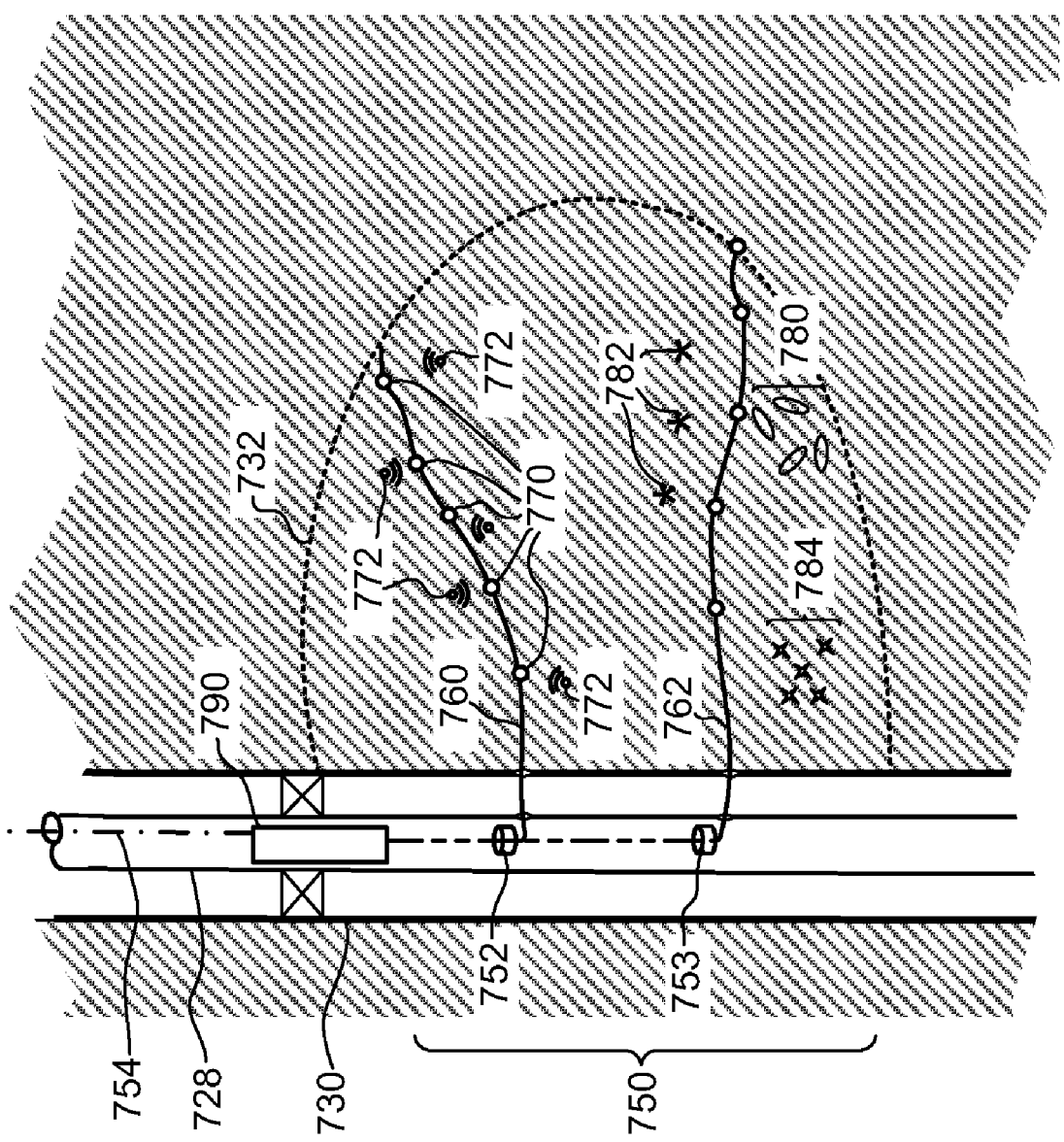
FIG. 7 shows fibers deployed in a fracture zone having sensors, processors and/or other devices deployed along their lengths either attached or detached from the fibers, according to certain embodiments.

FIG. 7 shows fibers deployed in a fracture zone having sensors, processors and/or other devices deployed along their lengths either attached or detached from the fibers, according to certain embodiments. BHA 728 is placed in wellbore 730. Continuous fibers 760 and 762 are shown deployed in the fracture zone bounded by frac front 732. Fibers 760 and 762 are drawn from spools 752 and 753 respectively. Although only two fibers and spools are shown in array 750 for simplicity, there would normally be many more fibers deployed in a fracture zone, such as described with respect to FIG. 1. Data are passed back by means of fibers 760 and 762 either electrically or optically, to a measurement module 790 in the BHA. From module 790, the data are relayed by communication line 754 (which can be either electrical or fiber-optic) to the surface. According to alternate embodiments, other forms of telemetry could be used instead of a physical line such as fluid pressure pulse telemetry, long-range electro magnetic wireless telemetry, or inductive transmission through the tubing and/or casing.

In fiber 760, a number of sensors 772 are released from fiber 760 and left loose in the fracture. Their measurements can be relayed by wireless means back to the continuous fiber 760 via receivers 770 located on fiber 760. Such wireless means are either electromagnetic or acoustic in principle.

Shown in the vicinity of fiber 762, the fracture is filled with polymers loaded with acoustic and electromagnetic scattering materials 782. Additionally, capsule shells 780 are provided which can be exploded with specificity by an external stimulus (acoustic, electromagnetic) to release materials such as swelling gels, acids, conducting polymer as needed. The carrier polymer can be made to suit the need of the specific well—be highly porous (like silica gel) or disintegrate after a certain time interval. Capsules 780 containing different chemicals can be embedded in different shells that can be specifically exploded as needed. For example, using a tool in the wellbore, targeted acoustic/EM signals can be sent that activate a specific capsule or capsules. In general, the integrated electromagnetic, acoustic, chemical functionalities can be either or both self-actuating and induced by external stimuli. Such functionalities include the ability to filter RF radiation and release a desired chemical. The capsule shells can be exploded with specificity by an external stimulus (acoustic, electromagnetic) to release materials such as swelling gels, acids, conducting polymer as needed, or by internal stress at the tip of the fracture. External logging and other tools may be used to interrogate the state of the proppant.

Scattering elements 782 can be used for scattering sound and electromagnetic waves. Examples of elements include straight wires, coils, and piezoelectric ceramic/polymer elements that can measure stress and report on position of the fracture tip. The scattering elements 782 thus provide a more controlled acoustic/electromagnetic response for determination of fracture size.

According to further embodiments, a novel polymeric gel and plastic material 784 is used to fill an hydraulic fracture in an oil or gas well to evaluate, control and monitor that fracture, in conjunction with other downhole measurement methods. The fracture is filled with suitable polymeric material (e.g., having conducting and/or piezoelectric elements embedded), initially to evaluate the geometry of the fracture by electrical and acoustic means, among other techniques. These gels will contain, among other sensory elements, conductive fibers with "neuronal" networks/circuits. These biologically-inspired networks will be endowed with nervous reflexes and non-cognitive (i.e. locally-processed) perception—this can be likened to sensory organs of jellyfish tentacles or Venus flytraps. Stress-sensitive capsules filled with acid and other fracturing fluids or chemicals can be activated to continue to induce stimulation at later times. There are also the options of closing fractures, controlling oil and water flows, and eventually sealing up the fractures.

Applications for the data collected with the sensors and/or fibers as described herein include: detecting the arrival of oil, gas, or water; and optimizing the pumping of the frac by monitoring local differences in pressure, temperature, etc., at various points within the frac wing. According to other embodiments, sensors make local measurements of the fracture width and variations thereof, as well as of the distribution and condition of proppant particles, clumps of particles, and/or proppant-related fibers.

Recently, there has been an increase in the use of applications of novel "soft" materials in various areas of physics, chemistry, materials science and biology. See, e.g. "Mechanoelectric effects in ionic gels," P. G. de Gennes, K. Okumura, M. Shahinpoor, K. J. Kim, Europhysics Letters, 50, 513-518, (2000); "Electric Flex: Electrically activated plastic muscles will let robots smile, arm-wrestle, and maybe even fly like bugs," Yoseph Bar-Cohen, IEEE Spectrum, (25 Jun. 2004); and "Autonomic healing of polymer Composites," White, S. R., N. R. Sottos, P. H. Geubelle, J. S. Moore, M. R. Kessler, S. R. Sriram, E. N. Brown, and S. Viswanathan, Nature 409, 794-797 (2001) (hereinafter "White et. al."), all of which are incorporated by reference herein. In particular, the autonomic healing of polymer composites has been proposed and has been shown to work by White et al. Combining these ideas, according to embodiments, methods are provided for delivering smart fluids that can be used for sensing and controlling fractures.

According to alternative embodiments, capsules 780 are filled with an autonomous healing polymer composite used to self-heal cracks such as described in White et al. Chemicals are embedded in the capsules that are sensitive to stress and ruptured near a crack. The chemical that flows from these ruptured microcapsules forms a crack-healing polymer when it comes into contact with a catalyst embedded in the surrounding matrix. According to embodiments, in an analogous manner, chemicals are provided that induce swelling to enhance the fracture, or release acid for further leaching, or even induce closing and chemically-induced healing when there is the need to abandon a well.

According to alternative embodiments, the fiber network or loose, wireless sensors shown in FIGS. 6 and 7 could also serve as actuators for purposes of influencing the frac during the pumping (releasing acid or other agents from capsules) or controlling the movement of fluids during and/or after the frac job (releasing gel breakers or viscosity enhancers or inhibitors to block water, allow oil to flow, etc.).

According to other embodiments, the fiber network or loose, wireless sensors are left in the frac after the hydraulic fracturing job for purposes of longer-term monitoring and/or control of the production of the well.

According to yet other embodiments, actions such as actuations, are triggered based on local sensory responses without any central control required.

Figure 8A:
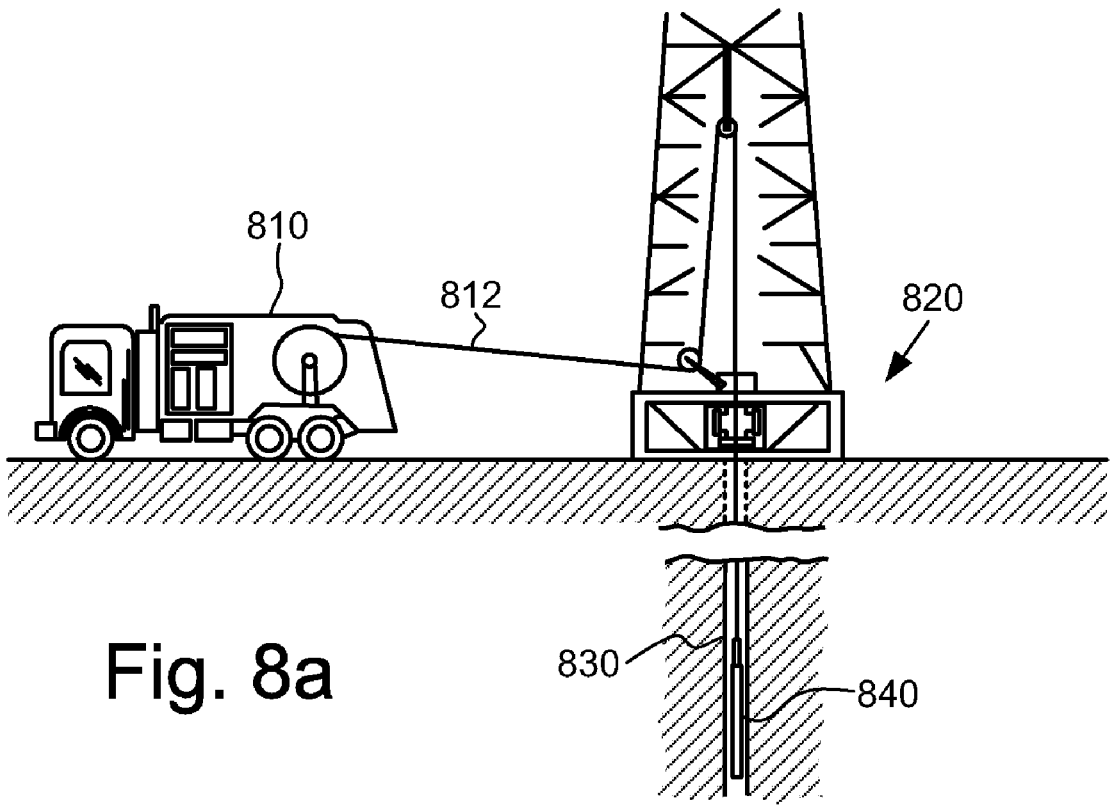
FIGS. 8a and 8b show a wireline cable having a high linear density of integrated sensors, according to embodiments.
Figure 8B:
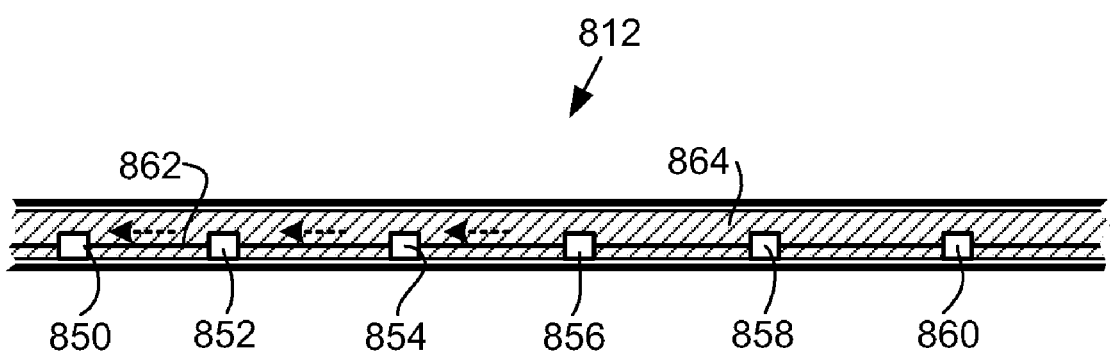

According to further embodiments, other sensing and data assimilation applications in long, linear structures will now be described. FIGS. 8a and 8b show a wireline cable having a high linear density of integrated sensors, according to embodiments. Shown in FIG. 8a is wireline truck 810 deploying wireline cable 812 into well 830 via well head 820. Wireline tool 840 is disposed on the end of the cable 812. Wireline cable 812 includes a number of sensors at many points along its length. FIG. 8b shows further detail of a small section of wireline cable 812. According to an example, the cable 812 is a heptacable that includes seven bundled conductors 864 and filler strands to give the cable a rounder shape and an interstitial filler to prevent air pockets and to make the core more rigid. A jacket and the two armor layers complete the outer layers. According to embodiments, a number of simple sensors 850, 852, 854, 856, 858, and 860 are provided in a spaced apart fashion along the length of the cable 812. For example, the sensors can be placed about every 10 cm along the length of cable 812. Each sensor is connected to its neighboring adjacent sensor via an interconnecting communication line, such as communication line 862 connecting sensors 850 and 852. This interconnecting line could be either a special dedicated line or a standard cable conductor otherwise used for conventional wireline tool data transmission and control. In order to maintain a relatively low data bandwidth while having a relatively high measurement linear density, only a very small amount of data is passed along from one sensor to another. According to one example, each sensor is programmed to detect an alarm situation such as a strain exceeding a predetermined threshold. If a sensor does not detect strain above the threshold then it does not generate any new data to be transmitted. However, if the sensor detects strain above the threshold then it transmits an alarm signal, along with its address to its neighboring sensor. For example, if sensor 856 detects an alarm situation, it sends an alarm signal and its address to sensor 854. Sensor 854 then sends the alarm and the address of sensor 856 to sensor 852. Sensor 852 then sends the alarm with the address of sensor 856 to sensor 850. In this way, the data bandwidth is maintained as relatively low despite having a great many sensors deployed. This type of local processor and discrimination and functionality could either be integral to the distributed sensors themselves or be performed by separate local processor modules. While the sensors 850, 852, 854, 856, 858, and 860 are described as strain sensors in the example above, many other types of sensors could instead be used according to other embodiments, such as: stress, temperature, broken armor wires, or anomalous electrical properties of the conductors or dielectric.

FIGS. 9a and 9b show seismic streamers having sensors and/or actuators with high linear density deployed in a marine environment, according to embodiments. Referring to FIG. 9a, seismic vessel 910 is shown on the sea surface 920. Below the surface 920 in sea water 930 are seismic streamers 912, each having a number of hydrophones 914. FIG. 9b shows further detail of a small section of a streamer 912. A Hydrophone 914 feeds data into datapath 964 as is known in the art. According to embodiments, a large number of auxiliary sensors are provided for monitoring and/or control purposes on streamer 912, having a high linear density such as 1-10 sensors per meter. Sensors 950, 954 and 958 are shown. According to one example, sensors 950, 954 and 958 are capable of sensing bending of the streamer, for example, by measuring strain or orientation in their immediate surroundings. In response to the sensed bending, each sensor, or local group of sensors, has associated with it an actuator for "straightening" or deflecting the streamer. Specifically, sensor 950 is linked to actuator 952, sensor 954 is linked to actuator 956 and sensor 958 is linked to sensor 960. Communication between the sensor and/or actuators can also be provided via communication lines such as line 962. The straightening or controlled deflecting action by actuators 952, 956 and 960 could be performed, for example, by differentially shortening or lengthening load-bearing internal streamer ropes (not shown) running the length of the streamers. Importantly, the activation of an actuator can be in response primarily to its closest sensor or a number of sensors in its local vicinity with little or no control from the ship or other remote location. Thus, a low-level "neuro-muscular" interaction of sensors and actuators is provided. Such functionality provides advantages such as improving the survey to survey repeatability of sensor placement (for "4D" or time-lapse seismic) while requiring little or no additional bandwidth on the existing streamer communication lines. Many other types of sensor and actuator combinations could be used. For sensors, other examples include: strain, stress, temperature, attitude or orientation, positioning (such as GPS), For actuators, other examples include: straightening or other controlled shaping or steering by means of controlled local deflections. Note that the sensors could also perform an alarm or "housekeeping" information function to the ship in a manner analogous to the sensors described in the wireline cable of FIGS. 8a and 8b.

FIGS. 10a and 10b show an ocean bottom cable having sensors and/or actuators with high linear density deployed in a marine environment, according to embodiments. Referring to FIG. 10a, seismic vessel 1010 is shown on the sea surface 1020. Below on the sea bottom 1032 is ocean bottom cable 1012, including thereon a number of multi component sensors 1014. FIG. 10b shows further detail of a small section of a ocean bottom cable 1012. A multi component sensor 1014 feeds data into datapath 1064 as is known in the art. According to embodiments, a large number of auxiliary sensors are provided on cable 1012 for monitoring or "housekeeping" purposes, having a high linear density such as 1-10 sensors per meter. Sensors 1050, 1054 and 1058 are shown. According to one example, sensors 1050, 1054 and 1058 are capable of sensing temperature, stress, strain, attitude or orientation, or local electric anomalies. In response to the sensed quantity, each sensor, or local group of sensors, can have associated with it an actuator. Specifically, sensor 1050 is linked to actuator 1052, sensor 1054 is linked to actuator 1056 and sensor 1058 is linked to sensor 1060. Communication between the sensor and/or actuators can also be provided via communication lines such as line 1062. Importantly, the activation of an actuator can be in response primarily to its closest sensor or a number of sensors in its local vicinity with little or no control from the ship or other remote location. Thus, a low-level "neuro-muscular" interaction of sensors and actuators is provided. Such functionality provides advantages such as improving the survey to survey repeatability of sensor placement (for "4D" or time-lapse seismic) while requiring little or no additional bandwidth on the existing streamer communication lines. Many other types of sensor and actuator combinations could be used. For sensors, other examples include: strain, stress, temperature, attitude or orientation, positioning (such as GPS). For actuators, other examples include: straightening or shifting in a controlled fashion by small streamer deflections. Detailed local knowledge or control of the geophone sensor placement on an irregular sea bottom can significantly improve the accuracy of a survey and its ability to be compared with other surveys taken at different times. Note that the sensors could also perform an alarm or information function to the ship in a manner analogous to the sensors described in the wireline cable of FIGS. 8a and 8b.

Although FIGS. 9a, 9b, 10a and 10b are directed to marine seismic applications, this sort of distributed sensor/actuator architecture in a long, linear structure could also be highly useful in improving the efficiency and accuracy of towed shape and position management and sea-bottom placement of other sorts of long, towed or laid structures, such as telecommunication or electric power transmission cables, pipelines, or other sorts of monitoring sensor streamers.

FIGS. 11a and 11b show a plurality of continuous fibers deployed in a gravel pack completion, according to embodiments. In FIG. 11a, wireline truck 1110 is shown deploying a wireline tool 1128 in well 1124 via wireline cable 1102 through wellhead 1120. Well 1124 is a gravel pack completion well. Gravel 1134 is packed in the production zone of the well in the annular space between the formation wall 1130 and screen 1132. According to embodiments, tool 1128 contains a large number of deployable continuous fibers. The fibers can be deployed using spool arrangement as shown in FIGS. 1 and 2. For deployment the well is pressured to be overbalanced such that there will be fluid flowing from the well into the formation. Viscous drag is used to transport the fibers from tool 1128, through screen 1132 and into gravel pack 1134. The fibers preferably are equipped with small sensors such as shown and described with respect to FIG. 6. The sensors can be used to detect fluid flow, density, rheology, chemical properties, temperature, pressure, and other physical/chemical quantities. The data from the sensors is passed back through the fibers as described above, and from tool 1128 to the surface for recording and further analysis.

Although a tool 1128 is shown as a wireline tools in FIG. 11a, in some applications it will be useful to instead use a BHA mounted on coiled tubing, as shown and described with respect to FIGS. 1 and 2. By using coiled tubing, fluid can be pumped directly through the BHA and facilitate deployment of the fibers within the gravel pack.

FIG. 11b shows further details of deployment of continuous fibers in a gravel pack completion, according to certain embodiments. Fibers from tool 1128 are shown deployed past screen 1132 into the annular space 1136 between screen 1132 and the formation. Gravel 1134 is packed in a portion of annular space in zone 1150, but has failed to fill the space in zone 1152. Tool 1128, using the continuous fibers is used to detect the void in zone 1152. The fibers are much more likely to freely flow into the void 1152 than into the gravel packed zone 1150. Thus, by measuring the deployed lengths of the fibers as described herein, defects in the gravel pack can be detected and even mapped spatially to allow gravel pack repair or improved execution on the next completion.

Although the examples shown in FIGS. 11a and 11b are directed to a gravel pack completion, the described techniques are also applicable to other forms of completions and restricted-access well situations such as sand screens, slotted screens, valves, sucker-rod pumps and other sorts of artificial lift, electric submersible pumps (ESP's), etc. These and other combinations of fluids such as soft gels or completion fluids with continuous fibers and sensors making use of neural organization principles constitute a new paradigm of "soft, pumpable tools" that will allow physical access for measurement, characterization or interventions in difficult geometries and/or restricted spaces (e.g., oil and gas wells, water wells, and other subterranean structures); will be able to survive potentially much higher downhole pressures and temperatures; and will achieve major cost reductions over conventional wireline, drilling, testing, stimulation, and instrumented completions hardware architecture paradigms. It is noted that phrase "interventions in difficult geometries and/or restricted spaces" can include: 1) entry beyond an orifice that is either unrestricted/open, or partially blocked by an obstacle; 2) gaining access for sensing or measuring at a location either at or below a submersible pump; 3) gaining access to a location of interest for sensing or measuring relating to a system having elongated structures such as cables, pipes, tubes, etc.; 4) to gain access around an obstructed tubular structure, such as a pipe, tube; 5) or entry into a device in which fluid pass therethrough wherein the entry is structured in such a way that known sensing and measuring device cannot be used due to an irregular shape, size of the entry into the device.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A marine system, the system comprising:
   an elongated element designed and arranged to be deployed from a sea-going vessel into a sea;
   a plurality of actuators located on the elongated element; and
   a plurality of sensing elements spaced apart along substantially an entire length of the elongated element, wherein each sensor element of the plurality of sensing elements includes:
   a) an interconnecting communication line communicatively connected to one or more neighboring adjacent sensor element; and
   b) at least one processor communicatively connected to the interconnecting communication line and the one or more neighboring adjacent sensor element;
   wherein the at least one processor detects an alarm situation based upon exceeding a predetermined threshold and then activates a conditioned response signal that provides for the capability of a local neuro-muscular interaction of the one or more neighboring adjacent sensor element and each actuator of the plurality of actuators.

2. The system according to claim 1, wherein the marine system is a marine seismic survey system, the sea-going vessel is a seismic vessel, and the elongated element is further designed and arranged to collect seismic information from a plurality of receivers spaced apart along the length of the elongated element.

3. The system according to claim 2, wherein the elongated element is a seismic streamer designed to be deployed in the sea near a sea surface, and the plurality of receivers are hydrophones.

4. The system according to claim 3, wherein the elongated element includes the plurality of receivers and the plurality of sensing elements, such that the plurality of sensing elements are at least 100 sensing elements.

5. The system according to claim 3, wherein the elongated element includes the plurality of receivers and the plurality of sensing elements, such that the plurality of sensing elements are at least 1000.

6. The system according to claim 3, wherein the elongated element includes the plurality of receivers and the plurality of sensing elements, such that the plurality of sensing elements is at least one sensing element per meter over substantially the entire length of the seismic streamer.

7. The system according to claim 1, wherein the plurality of sensing elements are of one or more type selected from the group consisting of one of strain, stress, temperature, attitude, orientation or positioning.

8. The system according to claim 1 wherein the plurality of actuators are located on the elongated element in a spaced apart fashion along substantially the entire length of elongated element and the interconnecting communication line is one of wireless or hard wired.

9. The system according to claim 8, wherein
each actuator of the plurality of actuators is communicatively linked via at least one processor to one or more nearby sensing element of the plurality of sensing elements and activates in response to the alarm situation sensed for example the conditioned response sensed signal by the one or more nearby sensing element which results in the local neuro-muscular interaction of the one or more nearby sensing element and each actuator of the plurality of actuators;
wherein the local neuro-muscular interaction includes the at least one processor receiving the conditioned response sensed signal from the one or more nearby sensing element and then sends an activating signal to each actuator of the plurality of actuators.

10. The system according to claim 8, wherein the plurality of actuators are of one or more type selected from the group consisting of one of straightening, other controlled shaping or steering by means of controlled local deflections.

11. The system according to claim 2, wherein the elongate element is an ocean bottom cable designed to be deployed on a sea floor of the sea, and the plurality of receivers are multi-component sensors.

12. The system according to claim 2, wherein the elongate element includes the plurality of receivers and the plurality of sensing elements, such that the plurality of sensing elements are at least 100 sensing elements.

13. The system according to claim 2, wherein the elongate element includes the plurality of receivers and the plurality of sensing elements, such that the plurality of sensing elements are at least 1000.

14. The system according to claim 11, wherein the plurality of sensing elements is at least one sensing element per meter over substantially the entire length of the ocean bottom cable.

15. The system according to claim 11, wherein the plurality of sensing elements are of one or more type selected from the group consisting of one of strain, stress, temperature, attitude, orientation or positioning.

16. The system according to claim 11, wherein the elongated element is a seismic streamer such that the seismic streamer further comprises a plurality of actuators located on the seismic streamer and spaced apart along substantially an entire length of the ocean bottom cable.

17. The system according to claim 16, wherein each actuator of the plurality of actuators activates in response to a condition sensed by one or more nearby sensing element of the plurality of sensing elements.

18. The system according to claim 17, wherein the plurality of actuators are of one or more type selected from the group consisting of one of straightening, other controlled shaping or displacement by means of controlled local deflections.

19. A method for conducting a marine seismic survey, the method comprising:
deploying a seismic streamer in sea water from a seismic vessel, the seismic streamer having a plurality of hydrophones for collecting seismic information;
actuating one or more actuator located on the seismic streamer; and
sensing with a plurality of secondary sensing elements that are spaced apart along substantially an entire length of the seismic streamer, wherein each secondary sensor element of the plurality of secondary sensing elements include: (a) an interconnecting communication line communicatively connected to one or more neighboring adjacent secondary sensor element; and (b) at least one processor communicatively connected to the interconnecting communication line and the one or more neighboring adjacent secondary sensor element;
wherein the at least one processor detects an alarm situation based upon exceeding a predetermined threshold and then activates a conditioned response signal that provides for the capability of a local neuro-muscular interaction of the one or more neighboring adjacent secondary sensor element and each actuator of the one or more actuator.

20. The method according to claim 19, wherein the plurality of secondary sensing elements are at least 1000.

21. The method according to claim 19, wherein the plurality of secondary sensing elements is at least one secondary sensing element per meter over substantially the entire length of the seismic streamer and the interconnecting communication line is one of wireless or hard wired.

22. The method according to claim 21, wherein the plurality of secondary sensing elements are of one or more type selected from the group consisting of one of strain, stress, temperature, attitude, orientation or positioning.

23. The method according to claim 19,
wherein the one or more actuator is located in a spaced apart fashion along substantially the entire length of the streamer such that each actuator of the one or more actuator is communicatively linked via at least one processor to one or more nearby secondary sensing element of the plurality of secondary sensing elements and activates in response to the alarm situation sensed for example the conditioned response sensed signal by the one or more nearby sensing element which results in the local neuro-muscular interaction of the one or more nearby sensing element and each actuator of the plurality of actuators;
wherein the local neuro-muscular interaction includes the at least one processor receiving the conditioned response sensed signal from the one or more nearby sensing element and then sends an activating signal to each actuator of the plurality of actuators.

24. The method according to claim 23, wherein the one or more actuator is of one or more type selected from the group consisting of one of straightening, other controlled shaping or steering by means of controlled local deflections.

25. A method for conducting a marine seismic survey, the method comprising:

deploying an ocean bottom cable on a sea floor of an ocean, the ocean bottom cable having a plurality of multi-component sensors for collecting seismic information;

actuating one or more actuator located on the ocean bottom cable; and sensing with a plurality of secondary sensing elements that are spaced apart along substantially an entire length of the ocean bottom cable, wherein each secondary sensor element of the plurality of secondary sensing elements include: (a) an interconnecting communication line communicatively connected to one or more neighboring adjacent secondary sensor element; and (b) at least one processor communicatively connected to the interconnecting communication line and the one or more neighboring adjacent secondary sensor element;

wherein the at least one processor detects an alarm situation based upon exceeding a predetermined threshold and then activates a conditioned response signal that provides for the capability of a local neuro-muscular interaction of the one or more neighboring adjacent secondary sensor element and each actuator of the one or more actuator.

26. The method according to claim 25, wherein the plurality of secondary sensing elements are at least 1000.

27. The method according to claim 25, wherein the plurality of secondary sensing elements is at least one secondary sensing element per meter over substantially the entire length of the ocean bottom cable.

28. The method according to claim 25, wherein the plurality of secondary sensing elements are of one or more type selected from the group consisting of one of strain, stress, temperature, attitude, orientation or positioning.

29. The method according to claim 25 wherein the one or more actuator is located in a spaced apart fashion along substantially the entire length of the ocean bottom cable, such that each actuator of the one or more actuator is communicatively linked via at least one processor to one or more nearby secondary sensing element of the plurality of secondary sensing elements and activates in response to the conditioned response sensed signal by the one or more nearby secondary sensing element which results in the local neuro-muscular interaction of the one or more nearby secondary sensing element and each actuator of the one or more actuator;

wherein the local neuro-muscular interaction includes the at least one processor receiving the conditioned response sensed signal from the one or more nearby secondary sensing element and then sends an activating signal to each actuator of the one or more actuator.

30. The method according to claim 29, wherein the one or more actuators are of one or more type selected from the group consisting of one of straightening, other controlled shaping or steering by means of controlled local deflections.

31. The system according to claim 1, wherein the elongate element is an ocean bottom cable designed to be deployed on a sea floor of the sea, such that each sensor of the plurality of sensing elements is programmed to detect the alarm situation based upon exceeding the predetermined threshold, otherwise if the alarm situation is not detected then each sensor of the plurality of sensing elements does not generate any new data to be transmitted.

* * * * *